April 29, 1930.  H. J. KLINE  1,756,029

INTERNAL COMBUSTION ENGINE

Filed July 5, 1927    4 Sheets-Sheet 1

Inventor.

HERBERT J. KLINE

By  Irving Harness

Attorney

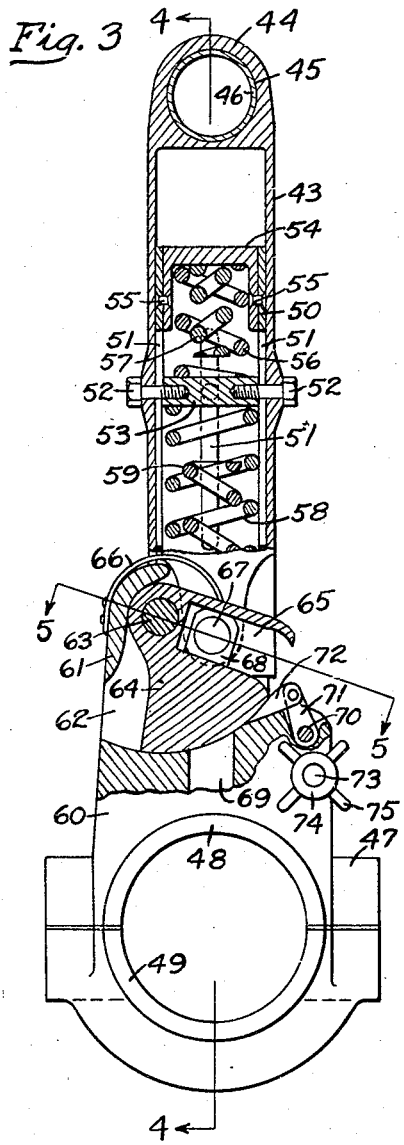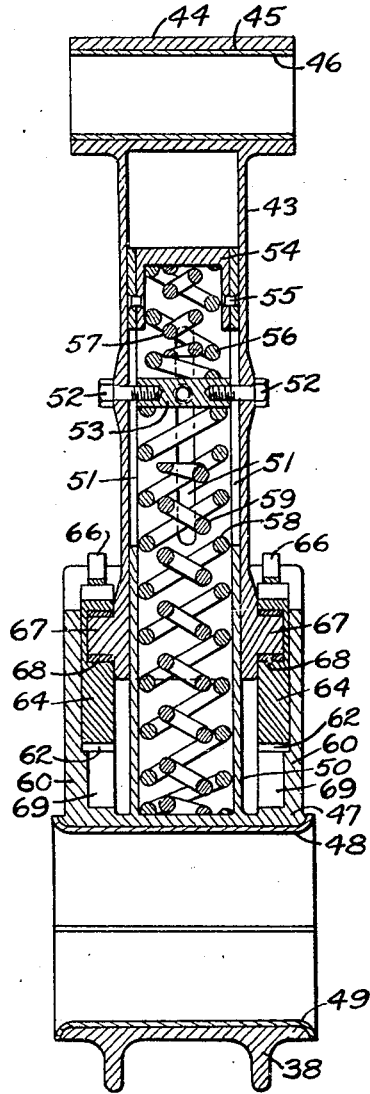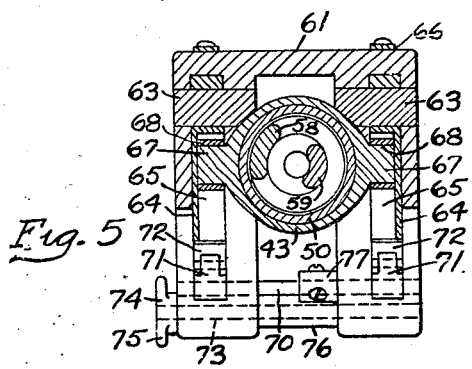

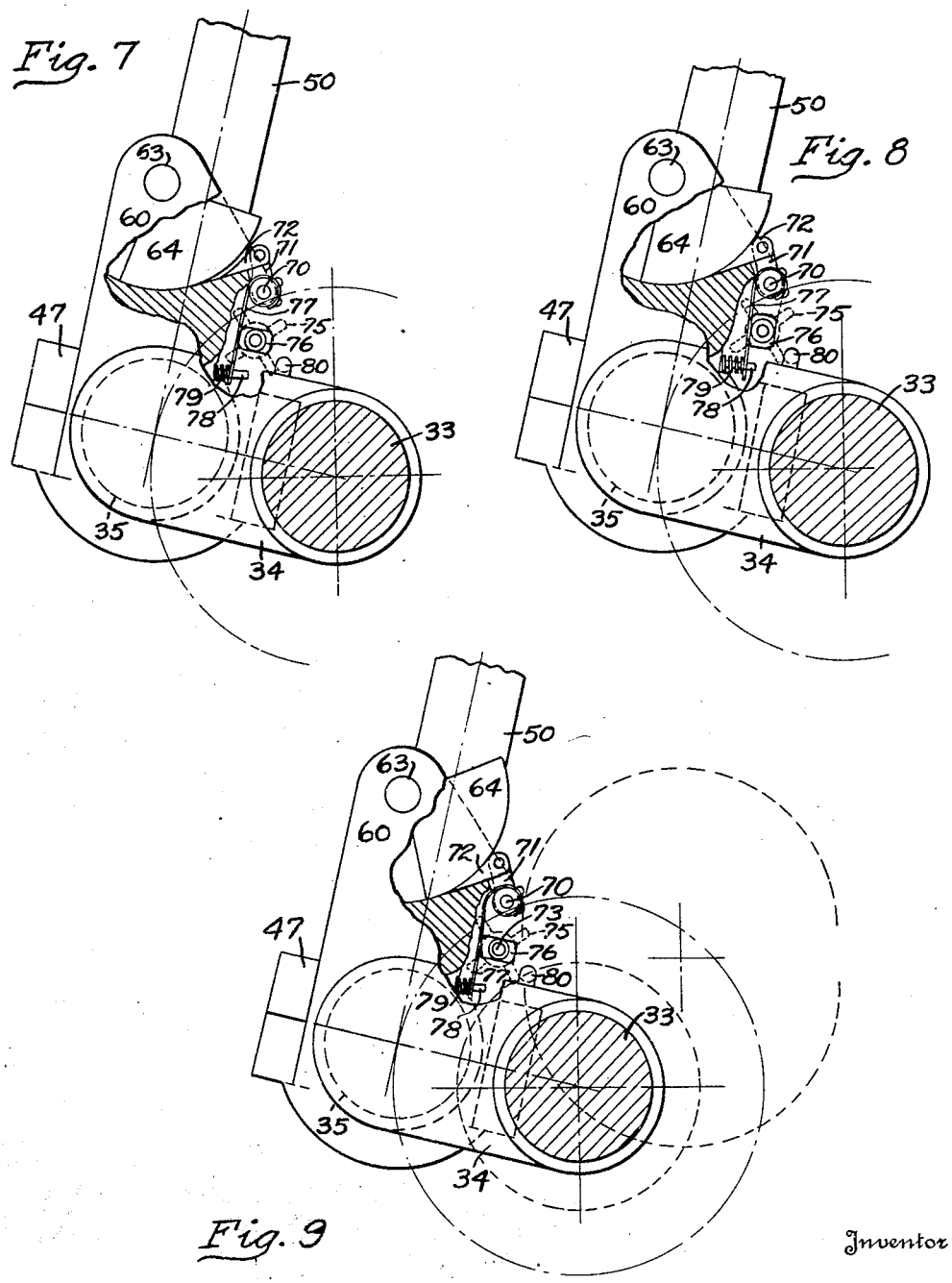

April 29, 1930.  H. J. KLINE  1,756,029
INTERNAL COMBUSTION ENGINE
Filed July 5, 1927    4 Sheets-Sheet 4

Inventor
HERBERT J. KLINE
By *(signature)*
Attorney

Patented Apr. 29, 1930

1,756,029

UNITED STATES PATENT OFFICE

HERBERT J. KLINE, OF JACKSON, MICHIGAN

INTERNAL-COMBUSTION ENGINE

Application filed July 5, 1927. Serial No. 203,345.

This invention relates to internal combustion engines, the principal object being to increase the power output of an internal combustion engine by providing a construction permitting a relative increase in the speed and torque for a given size of engine.

Another object is to provide a construction in which the velocity of the combustible mixture entering the cylinder at high engine speeds will increase at a rate less than the corresponding increase of the engine speed.

Another object is to provide a construction for internal combustion engines in which the inertia of the reciprocating parts is utilized during the non-power strokes of the engine to increase the volumetric efficiency of the engine, to obtain better scavenging of the exhaust gases, and to increase the compression ratio at higher engine speeds.

Another object is to provide an internal combustion engine having an intake and an exhaust port above the upper surface of the piston at the top of its stroke, and a second intake port in the cylinder below the top of the piston at the bottom of its normal stroke, means being provided for moving the piston to uncover the second intake port above a predetermined engine speed.

Another object is to provide an internal combustion engine construction in which the compression ratio is increased with the increasing speed of the engine.

Another object is to provide an internal combustion engine in which the volume of the cylinder swept by the piston increases with the increasing speed of the engine.

Another object is to provide a construction for internal combustion engines in which the volume swept by the piston on the scavenging stroke thereof increases with the increasing speed of the engine.

Another object is to provide a connecting rod for an internal combustion engine capable of both automatically increasing and decreasing its normal length.

Another object is to provide a connecting rod for an internal combustion engine capable of increasing and decreasing its normal length, and provided with means for preventing a predetermined decrease of its normal or increased length.

A further object is to provide an internal combustion engine having an intake port above the top surface of its piston when at the top of its stroke, and a second intake port below the top of the piston when at the bottom of its normal stroke, a connecting rod connecting the piston to the crank shaft capable of both automatically increasing and decreasing its normal length when acted upon by the inertia of the piston, means carried by the connecting rod for locking it against decrease of its normal or increased length, and means cooperating therewith carried by the crank shaft for preventing such locking means from operating except on the last part of the compression stroke, the power stroke and the first half of the exhaust stroke of the piston, whereby the rod will be allowed to shorten on the intake stroke of the piston to move the piston below its normal lowest position to uncover the second intake port and thereby draw an increased amount of combustible mixture into the cylinder.

The above being among the objects of the present invention, the same consists in certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several views,—

Fig. 3 is a partially sectioned view of the connecting rod shown in Fig. 2, taken on line 3—3 of Fig. 2, parts of the connecting rod being broken away to better illustrate the construction of the same.

Fig. 4 is a sectional view of the connecting rod taken on line 4—4 of Fig. 3.

Fig. 5 is a sectional view of the connecting rod taken on line 5—5 of Fig. 3.

Fig. 7 is a fragmentary broken view of the connecting rod and crank shaft of the engine shown in Fig. 1 illustrating the position of the various parts when the means for locking the connecting rod against decrease in length is in inoperative position.

Fig. 8 is a view similar to Fig. 7 illustrating the position of the locking means when in operative position to lock the connecting rod against decrease in length.

Fig. 9 is a view similar to Figs. 7 and 8 illustrating the position of the mechanism when the connecting rod is in lengthened condition and is locked against decrease in length from such position, and also illustrating the relative paths of movement of the pin or finger on the crank shaft with relation to the spindle wheel on the connecting rod.

Figure 1:
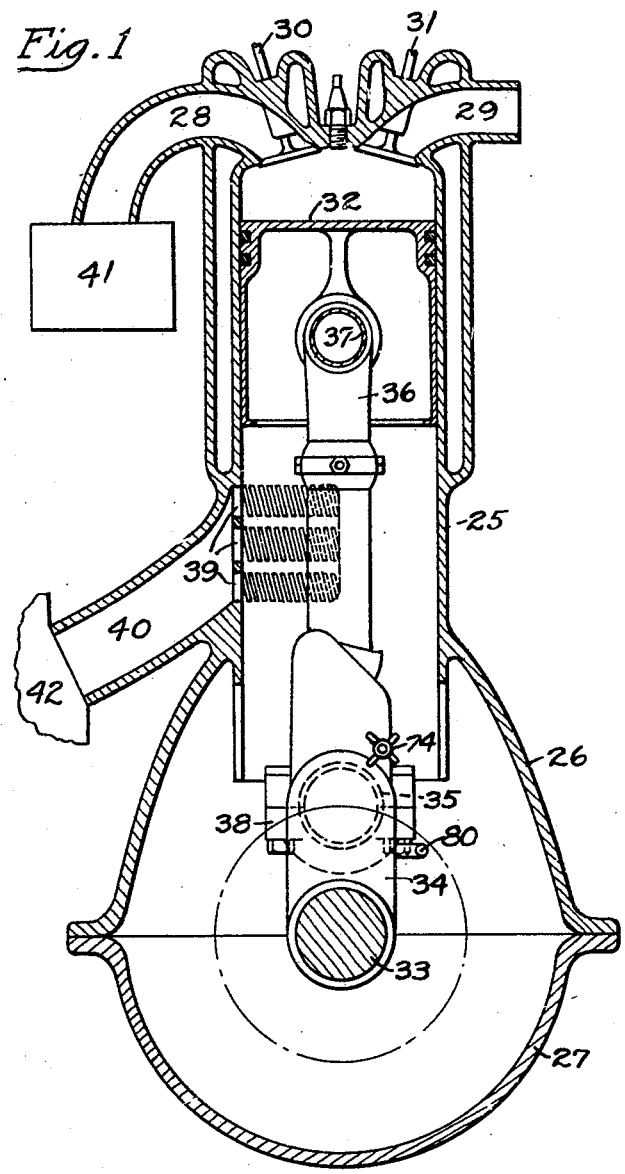
Fig. 1 is a vertical sectional view, taken transversely of a single cylinder internal combustion engine constructed in accordance with the present invention, axially of the cylinder thereof.
Figure 2:
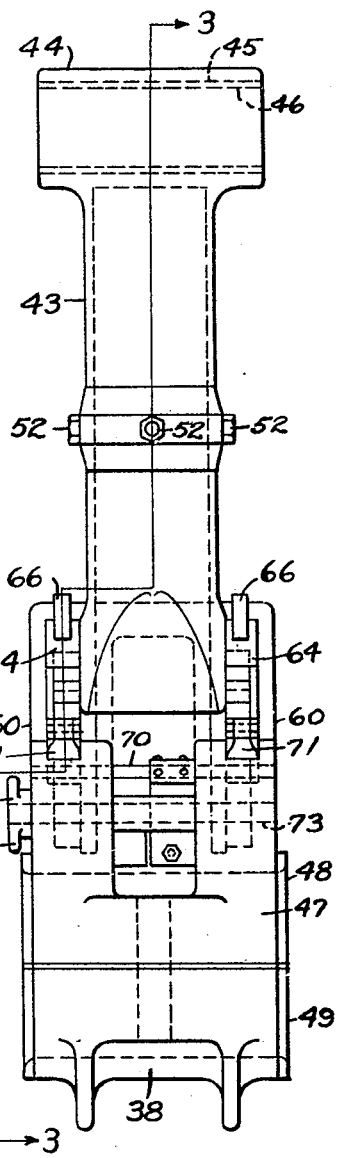
Fig. 2 is an enlarged side view of the connecting rod employed in the engine shown in Fig. 1.
Figure 6:
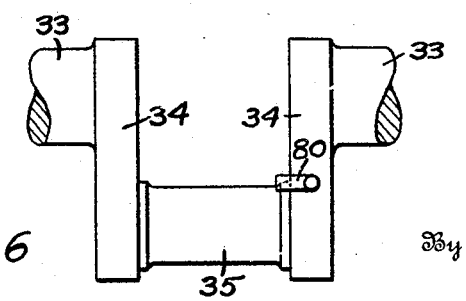
Fig. 6 (Sheet 1) is a fragmentary view of the crank shaft of the engine shown in Fig. 1 showing the position of the pin or finger member thereon which cooperates with the locking mechanism on the connecting rod.

As stated above, the principal object of the present invention is to increase the power output of the internal combustion engine by increasing the speed and torque of the same. This increased speed and torque is obtained by better scavenging of the exhaust gases from the cylinder, increasing the volumetric efficiency, and providing higher compression ratios at higher engine speeds.

It is well known that one of the principal factors which limits the speed of internal combustion engines is the decrease in volumetric efficiency or a decrease of the amount of combustible mixture taken into the cylinders as the speed of the engine increases. It is an object of the present invention to provide means for retarding this relative decrease in volumetric efficiency as the engine speed increases thereby providing a construction in which the peak of the horse power curve occurs at a relatively greater engine speed than is ordinarily obtained.

It is also well known in the art that the inertia forces due to the reciprocating parts of the engine (piston and part of the connecting rod) increases as the square of the engine speed. It is another object of this invention to employ these inertia forces during the non-power strokes of the engine to increase the volumetric efficiency, to obtain better scavenging of the exhaust gases, and to obtain higher compression ratios at higher engine speeds.

The inertia forces are the forces that are evident in starting and stopping the piston and part of the connecting rod in their up and down or to and fro movement in the cylinder between the limits of the stroke. As is well understood by those versed in the art, when the axis of the connecting rod is at right-angles to the corresponding throw of the crank shaft, the inertia forces are zero, and a line drawn through the axis of the crank shaft and the axis of the big end of the connecting rod represents what may be termed as "the zero axis" of inertia forces, this being true on both sides of the crank shaft. The inertia forces in the upper half of the stroke are active when the throw of the crank shaft is above the zero axes, and are active in the lower part of the stroke when the throw of the crank shaft is below the zero axes. The piston in travelling upward from one zero axis to its corresponding end of the stroke imparts energy to the piston. The same relative transfer of energy occurs between the piston and the crank shaft when the piston is moved downwardly from the last mentioned zero axis position of the crank shaft to the bottom of the stroke, and from the bottom of the stroke to the first mentioned zero axis. The inertia forces are exactly equal and opposite to the forces exerted by the crank shaft which accelerate the piston from the position of no movement to the position of greatest movement, and retard the piston from the position of greatest movement to the position of no movement. The connecting rod being the connecting link between the piston and crank shaft, the inertia forces set up in the reciprocating parts are transmitted to and from the crank shaft by the connecting rod. It is also apparent that when the piston is at the end of its stroke it is at rest, and of itself, in this position, contains no energy or ability to do work.

This invention embodies the use of a flexible connecting rod between the piston and crank shaft, and also embodies the use of the inertia forces of the piston and part of the connecting rod as the means for varying the length of the connecting rod and thereby varying the length of the strokes of the piston to obtain the results hereinbefore stated and hereinafer described.

More specifically, a connecting rod is employed which is yieldable so as to be capable of both increasing and decreasing its normal length. The inertia forces transmitted by this connecting rod naturally tend to increase the length of the same at the end of the compression and the exhaust strokes, and to shorten the same at the end of the intake and power strokes. In connection with this connecting rod, means are provided for locking the connecting rod against contraction either in its normal or lengthened condition during the latter part of the compression stroke and the full power stroke, and allowing it to increase in length both on the compression stroke and exhaust stroke and to shorten on the suction stroke at such engine speeds wherein the inertia forces in the piston attain sufficient value to overcome or partially overcome the yieldable means tending to hold the connecting rod in its normal length.

Referring to the drawings, Fig. 1 illustrates an internal combustion engine having a cylinder 25 provided with an integral crank case upper half 26 and crank case lower half or oil pan 27. The cylinder head is formed integral with the cylinder 25 and is provided with an intake passage 28 and exhaust passage 29. Suitable valves such as 30 and 31 cooperate with the passages 28 and 29 to allow the combustible mixture to enter the cylinder 25 through the passage 28 and the burnt gases to escape through the passage 29. Slidably received within the cylinder 25 is a piston 32 of conventional construction, and rotatably supported between the crank case upper and lower halves 26 and 27 respectively is the crank shaft 33 provided with throws 34 and connecting rod journal 35. A connecting rod, indicated generally as 36 in Figs. 1 and 10 to 13 inclusive, is pivotally connected to the piston 32 by the piston pin 37, and is pivotally secured to the journal 35 of the crank shaft 33 by means of a conventional cap 38. Ports 39 are formed in the side walls of the cylinder 25 below the upper surface of the piston 32 when the piston 32 is at the bottom of its normal stroke, the ports 39 leading into a common passage 40. A carburetor 41 is operatively connected to the passage 28, and a second carburetor 42 is likewise connected to the passage 40, although it is to be understood that both passages 28 and 40 may be connected to a single carburetor if such construction is thought desirable.

If the connecting rod 36 were of conventional design and such that the length of the same remained constant irrespective of engine speed, it will be apparent that the construction thus far described would operate in the same manner as any conventional engine,—that is, upon the suction stroke of the piston 32, the valve 30 would open and allow combustible mixture to be drawn into the cylinder from the carburetor 41, the piston in such case not moving sufficiently far down in the cylinder 25 to uncover the ports 39. On the subsequent compression stroke of the piston 32, the valve 30 would close and the combustible mixture in the cylinder 25 would be compressed, the same would be exploded at the beginning of the succeeding power stroke of the piston 32, and the burnt gases would be expelled past the valve 31 and out of the passage 29 on the following exhaust stroke. This same cycle of operations occurs in the present construction at what, for the purpose of the present invention, are termed "low" engine speeds. By such engine speeds is meant those speeds below approximately half of the maximum speed of the engine, or below any such speed at which it may be found desirable to bring the automatic increasing and decreasing of the length of the connecting rod into play.

By the use of the flexible connecting rod employed in the present invention, means are provided at what is herein termed "high" engine speeds, that is, speeds above what are above termed as "low" speeds, to increase the normal movement of the piston on its upstroke to both increase the compression ratio of the engine and to drive a greater amount of exhaust gases out of the same on the exhaust stroke, and to increase the travel of the piston on its down stroke during the intake stroke of the same, whereby to move its upper surface to a point below the upper limit of the ports 39 and thereby provide an additional means for the entrance of combustible mixture into the cylinder 25 above the piston 32.

This connecting rod which is best shown in Figs. 2 to 5 inclusive, comprises two main parts, an upper and a lower part. The upper part comprises a tubular portion 43 terminating at its upper end in a transverse tubular portion 44 provided with an opening 45 therein lined with a conventional bushing 46 for the reception of the piston pin 37. The lower part comprises semi-cylindrically shaped portion 47 provided with a bushing 48 adapted to receive the journal 35 of the crank shaft 33, and is held in cooperative relationship therewith by the cap 38 previously referred to, which is likewise provided with a suitable bushing 49. The portion 47 is provided with an upwardly extending tubular portion 50 which is telescopically received within the tubular portion 43 of the upper part of the connecting rod in sliding relationship therewith. The tubular portion 50 is provided with a plurality of slots 51 through the walls thereof through which screws 52, projecting through the walls of the tubular portion 43, extend in sliding relationship thereto and threadably engage the block 53 slidably received within the tubular portion 50. The upper end of the tubular portion 40 is provided with a plug member 54 secured against relative movement therein by any suitable means such as the rivets 55. Held under compression between the plug 54 and block 53 is a coil spring 56, and loosely positioned within the coil spring 56 and between the block 53 and plug 54 is a second coil spring 57 of a length less than the normal distance between the plug 54 and block 53. Held under compression between the block 53 and the surface of the portion 47 is a coil spring 58 similar to the coil spring 56 but of a relatively greater length, and loosely positioned within the coil spring 58 is a second coil spring 59 of a length less than the normal distance between the block 53 and portion 47. The springs 56 and 58 are so proportioned in respect to each other that they tend to hold the block 53 between the end limits of the grooves 51 but preferably nearer the upper limit of the same. The springs 56 and 57 in acting through the block 53 and screws 52 tend to hold the upper and lower connecting rod parts in a predetermined relationship, and at a distance between the axis of the opening 45 and the axis of the cylindrical portion 47 which is herein termed the "normal" length of the connecting rod, this being the length at which the engine functions at the aforementioned low engine speeds as an engine of conventional design.

It will be apparent from the foregoing that the connecting rod upper and lower parts are connected together for sliding movement relative to each other axially of the tubular portions 43 and 50, and that such sliding action is normally restrained by the springs 56 and 58. It will also be apparent that during the operation of the engine, when the piston is moving up and down or to and fro, the inertia of the piston during the latter part of its outward stroke will tend to compress the spring 56 and increase the length of the connecting rod, and during the latter part of its inward or downward movement the inertia of the piston will tend to compress the spring 58 and decrease the length of the connecting rod, the spring 58 normally restraining this tendency. It will also be apparent that on the first part of the upward or outward movement of the piston, the energy from the crank shaft transmitted to the piston through the connecting rod in order to accelerate the movement of the piston, will tend to compress the spring 58 and shorten the connecting rod, and it will also be apparent that the energy transmitted from the crank shaft to the piston and moving the piston from its upper or outermost position downwardly or inwardly in order to accelerate the same, except perhaps on the power stroke when the energy of the explosion will relieve the crank shaft from transmitting energy to the piston, will tend to lengthen the connecting rod. In other words, the forces transmitted between the piston and crankshaft at the outer and inner portions of the stroke will tend to alternately lengthen and shorten the connecting rod, this tendency being restrained by the springs 56 and 58 respectively. These springs are so proportioned that until the maximum low speed of the engine previously referred to is reached, substantially no sliding action between the tubular portions 43 and 50 with the corresponding lengthening or shortening of the connecting rod will occur, but beyond such speeds the inertia forces in the piston due to its movement, and the energy expended by the crank shaft necessary to accelerate the piston from its extreme positions will overcome the tension of the springs 56 and 58 and allow the connecting rod to be either shortened or lengthened as the case may be. The springs 57 and 59 are provided for the purpose of gradually increasing the spring resistance to such increasing or decreasing of the length of the connecting rod and for preventing a condition wherein the screws 52 might have sufficient movement to come in contact with the limits of the slots 51 and thereby result in an apparent knocking in the engine. The springs 56 and 57 are made relatively shorter and stiffer than the springs 58 and 59 because of the fact that the inertia forces acting during the outer part of the stroke of the piston are of greater value than those acting during the inner or lower part of the stroke of the piston and thereby tends to cause a relatively greater increase in the length of the connecting rod than a decrease thereof, and because a greater relative shortening of the connecting rod may be preferable in the present invention than lengthening thereof. However, it is to be understood that the relative lengths of the springs 56 and 58, as well as their cooperative springs 57 and 59, may be changed to obtain any desired movement of the piston which may be found desirable or necessary. For instance, it may be found that the ports 39 should be of a greater or less depth than shown in the drawings, and that it is therefore desirable to allow the connecting rod to shorten to a greater or lesser degree than the amount illustrated, or it may be found desirable to allow a greater or lesser amount of lengthening of the connecting rod in order to obtain a better proportioned "high" speed compression ratio, and this may be provided by changing the lengths and stiffness of the springs, proper precautions being taken in the length and position of the slots 51, of course, to accommodate the same.

It will be further apparent to those skilled in the art that should the connecting rod thus described be freely expandible and contractible in length at all times during the operation of the engine, no real advantage would result, for although a higher compression ratio might be momentarily obtainable at high engine speeds, the spring 58 would be compressed upon explosion and this advantage would be lost. Likewise, at high engine speeds the piston 32 would uncover the ports 39 both on the suction stroke and at the end of the power stroke, resulting in the discharge of flame into the passage 40. The present invention provides means whereby the connecting rod described is allowed to increase or decrease its normal length during those phases of the cycle of operations of the engine where such may be to the advantage thereof, and to lock the same against decrease in either its normal length or extended length at those points in the cycle of operations of the engine where such is necessary or desirable, and this mechanism will now be described.

Secured to the portion 47 of the lower part of the connecting rod are two upwardly spaced walls 60 joined along one side by a cross-wall 61, as indicated in Fig. 3. A recess 62 is cut out of each of the opposed inner faces of the walls 60 and swingably mounted on the pins 63 carried by the walls 60 and within each recess 62 is a swinging member 64. The pins 63 are offset from the axial lines of the tubular portions 50 and 43, and the outer edges of the swinging members 64 are formed on the circumference of a circle having its center at the center of the pins 63 and preferably slidably engage the adjacent edge of the recess 62 which is formed to the same shape.

Referring to Figs. 3 and 4, a groove 65 is formed in the upper portion of the opposed inner faces of the swingable members 64 on a line radial to the pins 63, the grooves 65 forming slides for a purpose which will hereafter be described. Leaf springs 66 secured to the cross wall 61 extend over the same and bear against the upper edges of the swinging members 64 and tend to swing the same in a clockwise direction as viewed in Fig. 3. Formed in opposed relationship on the lower portion of the tubular part 51 of the upper part of the connecting rod, and diametrically thereof, are two pins 67 which rotatably receive thereon blocks 68 which are in turn slidably received within the slides 65.

As the construction is thus far described, it will be apparent that upon relative movement between the tubular portions 43 and 50, the swinging members 64 will be caused to swing about the pins 63 either in clockwise or anti-clockwise direction as viewed in Fig. 3, according to whether the connecting rod is decreased or increased respectively from its normal length, the blocks 68 moving downwardly or upwardly with respect to the pins 63. In order to provide for such cases as where the amount of contraction or decrease in the length of the connecting rod would move the blocks 68 beyond the outer end of the slides 65, stationary slides 69 are formed within the inner walls of the wall portions 60 diametrically of the tubular portion 50 at the bottom of the recess 62 so that the blocks 68 may in such cases continue their movement out of the slides 65 and into the slides 69 which will thereby accommodate the same.

Extending between the walls 60 at the right-hand edge thereof, as viewed in Fig. 3, and rotatably received therein, is a shaft 70, and secured adjacent each end of the shaft 70 and extending upwardly therefrom adjacent each end thereof is an arm 71. Rotatably secured to the upper end of each arm 71 is a wedge member 72 which is projectable between the outer edge of the swinging member 64 and the cooperating lower edge of the recess 62. These surfaces are preferably roughened as are also the surfaces of the wedge members 72 so that upon projection of the wedge members 72 into contact with both the edges of the swinging members 64 and the lower edges of the recess 62, the swinging members 64 will be locked against swinging movement in a clockwise direction, as viewed in Fig. 3. Also extending between the side walls 60 immediately below the shaft 70 and rotatably received therein is a second shaft 73. One end of the shaft 73 projects out past the corresponding walls 60 and receives thereon a spindle wheel 74 provided with four equally spaced radial pins 75. Between the walls 60 the shaft 73 is provided with a cam member 76 rectangular in section, as best indicated in Figs. 7 to 9 inclusive. Secured to the shaft 70 is a leaf-spring 77 which extends downwardly into adjacent relationship with the cam 76, and its lower free end is slidably received on the transverse pin 78 secured in the lower portion 47 of the connecting rod. A coil spring 79 surrounding the pin 78 constantly urges the spring 77 into contact with the cam 76. The spring 77 and cam 76 are so proportioned with respect to each other that when one of the narrow faces of the cam 76 is in contact with the spring 77, the shaft 70 is moved in a clockwise direction, as viewed in Figs. 3, 7, 8 and 9 sufficiently to withdraw the wedges 72 from out of contact with the swinging members 64, as indicated in Fig. 7, and when one of the wide faces of the cam 76 is in contact with the spring 77, the shaft 70, moved by the spring 79 through the spring 77, is caused to turn in an anti-clockwise direction as viewed in the aforementioned figures, and to move the wedges 72 into contact with the swinging members 64 as indicated in Fig. 8.

By this construction, it will be apparent that when the inertia forces in the piston attempt to cause a decrease of the normal length of the connecting rod, and the wedges 72 are in contact with the swinging members 64, as indicated in Fig. 8, the swinging members 64 will be locked against movement in a clockwise direction, as indicated in Figs. 3 and 8, and such decrease in length of the connecting rod will be prevented. It will further be apparent that although the wedges 72 are in contact with the swinging members 64, any forces acting on the connecting rod tending to lengthen the same and to turn the swinging members 64 in an anti-clockwise direction will not be restrained, inasmuch as the position of the wedges 72 act to prevent rotation or swinging of the swinging members 64 in one direction only, the spring 77 yielding sufficiently in such cases to allow the swinging members 64 to slide over the same.

In order to actuate the cam 76 to properly control the wedges 72 to lock the swinging members 64 and therefore the connecting rod against reduction in normal or extended length during the proper phases or the cycle of operations of the engine, I provide a pin 80 on one of the throws of the crank shaft 33 in such a position that each time the throw 34 moves upwardly as viewed in Fig. 1, from its lower position to its upper position in a clockwise direction, it will engage one of the pins 75 on the spindle wheel 74 and will cause the shaft 73 and consequently the cam 76 to turn through an arc of 90°. In thus moving the cam 76, the narrow and broad faces of the cam 76 are alternately brought into engagement with the spring arm 77 thereby causing the wedges 72 to engage the swinging members 64 on each alternate full turning movement of 360° of the crank shaft 33, and to become disengaged therefrom during each other full revolution of the crank shaft 33. The rotative position of the cam 76 is so inter-related with respect to the mechanism (not shown) which operates the valves 30 and 31, that the wedge members are caused to engage the swinging members 64 during that revolution of the crank shaft including the power stroke of the piston 32, and to be placed in condition to become disengaged from the swinging members 64 during that revolution of the crank shaft including the suction stroke of the piston.

The operation is as follows:

Referring to Figs. 10 to 13 inclusive, which diagrammatically represent the various cycles of operation of the engine, the lines "a" and "b" represent the highest and lowest positions respectively of the top of the piston 32 when the engine is operating at "low" engine speeds, and the lines "c" and "d" represent the highest and lowest positions respectively of the top of the piston during the various phases of the cycle of operations of the engine when the engine is operating at "high" engine speeds. As previously explained, at those speeds of the engine herein termed "low" engine speeds, at which the inertia forces acting on the piston 32 are insufficient to cause an appreciable change in length of the springs 56 and 58, the top of the piston 32 in its up and down movement will move between the limits indicated by the lines "a" and "b", the operation of the same being identical to the operation of an engine of conventional design. At what are herein termed "higher" engine speeds, the upper surface of the piston 32 in its upward movement may move above the line "a" to a position indicated by the line "c" at the maximum speed of the engine, and may move below the line "b" in its downward movement as far as the line "d" at the maximum speed of the engine except when the length of the connecting rod is restrained from decreasing on the power stroke, as previously explained.

Figure 10:
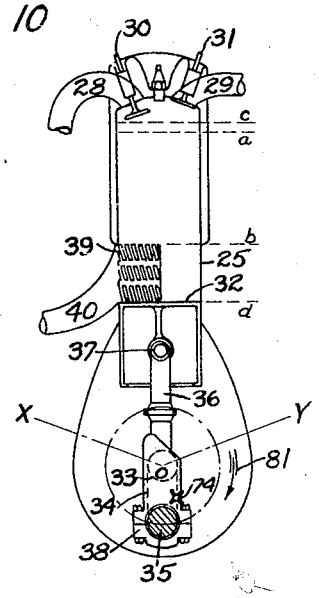
Fig. 10 is a more or less diagrammatic view of the engine shown in Fig. 1 illustrating the position of the piston when at the end of its intake or suction stroke and about to begin on the compression stroke, the connecting rod being shown in shortened position.

Considering the engine rotating at the so-called "high" speed, the cycle of operations is as follows:

Referring to Fig. 10 which illustrates the position of the parts when the piston 32 is at the bottom of the suction stroke and during which stroke the wedges 72 are out of engagement with the swinging members 64, it will be noted that the inertia of the piston 32 during the latter part of the suction stroke has caused the connecting rod 36 to shorten and to move the top of the piston 32 to its extreme low "high" speed position in which it has uncovered the ports 39 thereby allowing combustible mixture to enter the cylinder 25 through the passage 40 as well as through the passage 28 past the valve 30 which is held open during this stroke. It will thus be seen that a maximum volume of combustible mixture may be drawn into the cylinder 25 when the parts have assumed the relationship indicated in Fig. 10.

Figure 11:
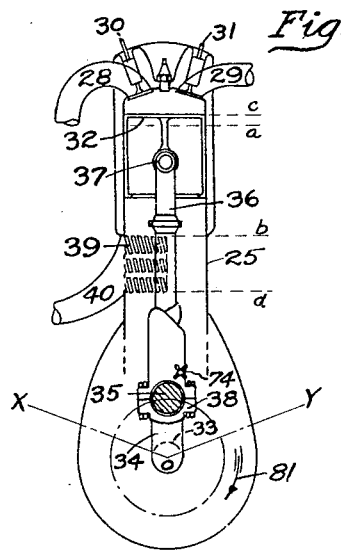
Fig. 11 is a view similar to Fig. 10 illustrating the position of the piston when at the end of the compression stroke and about to begin on the power stroke, the connecting rod being shown in lengthened position.
Figure 12:
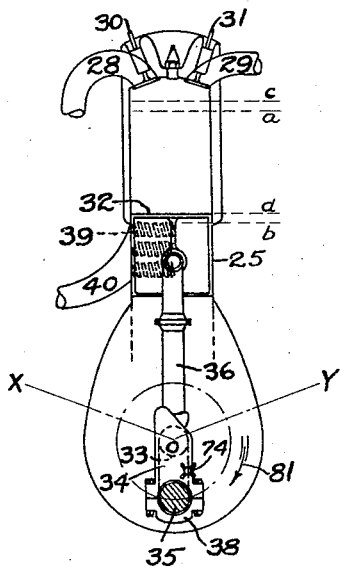
Fig. 12 is a view similar to Figs. 10 and 11, showing the position of the piston when at the end of the power stroke and about to begin on the exhaust stroke, the connecting rod being shown as still locked in lengthened position.
Figure 13:
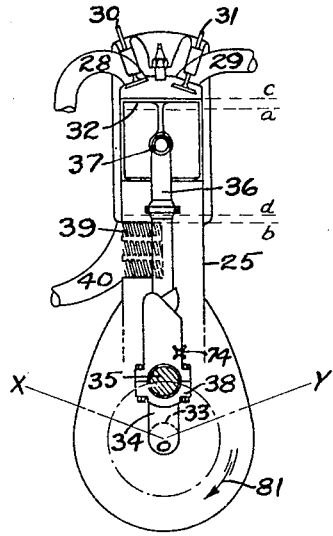
Fig. 13 is a view similar to Figs. 10, 11 and 12 illustrating the position of the piston when at the end of the exhaust stroke and about to begin on the suction stroke.

Fig. 11 indicates the positions of the various parts at "high" engine speed at the end of the compression stroke. As the piston 32 moves from the position shown in Fig. 10 to the position shown in Fig. 11, the crank shaft turning in the direction of rotation indicated by the arrows 81, the energy transmitted from the crank shaft 33 to the piston 32 through the connecting rod 36 in order to accelerate the same from a position of rest at the bottom of the stroke to a position of maximum speed along what has been termed the zero axis on the upward stroke, indicated by the line O—X, will react on the connecting rod to shorten the same. When the zero axis O—X is reached, the piston and the journal 35 of the crank shaft 33 will be travelling at the same speed and substantially no energy will be transmitted from one to the other, but as the crank shaft turns beyond the axis O—X it will act to retard the upward speed of the piston 32 and the inertia of the piston 32 in resisting this action will tend to increase the length of the connecting rod 16. As the crank shaft 33 revolves from the position shown in Fig. 10 to the position shown in Fig. 11, the pin 80 engages one of the pins 75 on the spindle wheel 74 and rotates the shaft 73 through an arc of 90° turning the same to bring one of the wide faces of the cam 76 into contact with the spring arm 77 thus allowing the shaft 70 to turn in an anti-clockwise direction as viewed in Figs. 3, 7, 8 and 9 sufficiently to force the wedge members 72 into contact with the swinging members 64 and placing the mechanism in position to prevent the connecting rod from decreasing in length. As the piston 32 moves upwardly from the position shown in Fig. 10 to the position shown in Fig. 11 and the inertia of the piston, after passing the zero axis O—X, tends to increase the length of the connecting rod, the spring 58 within the connecting rod is compressed, the tubular portions of the connecting rod 43 and 50 sliding relative to each other and thus increasing the length of the connecting rod. The wedges 72, as previously described, offer no substantial resistance to this increase in the length of the connecting rod because of the fact that the movement of the swinging members 64 is anti-clockwise, as viewed in the above mentioned figures, and tends to loosen the wedges 72. The inertia of the piston, therefore, and a portion of the connecting rod which, for ease of description, is herein referred to as piston only, causes the connecting rod to lengthen and allows the upper surface of the piston to pass beyond the line "a" and approach the line "c" an amount dependent upon the speed of the engine. It will be apparent that in thus moving above the line "a" the piston compresses the combustible mixture within the cylinder to a substantially greater degree than would be possible were it limited to moving up in the cylinder to the line "a" only. When the piston 32 has thus moved to the position shown in Fig. 11, at the end of the compression stroke, and the piston 32 has come to rest, the spring 58 thereupon tends to bring the connecting rod back to its normal length, but inasmuch as the wedges 72 are in contact with the swinging members 64 during this phase of the operation of the engine, the wedges 72 lock the swinging members 64 against movement in a clockwise direction, as viewed in the above mentioned figures, and the connecting rod is locked in such extended position. Upon explosion of the combustible mixture above the piston 32 when in the position shown in Fig. 11, the piston is driven downwardly to the position shown in Fig. 12 which is the position it assumes at the end of the power stroke. Inasmuch as the wedges 72 have prevented shortening of the extended length of the connecting rod indicated in Fig. 11, the top of the piston when in the position shown in Fig. 12, will be above the normal lowest position of the piston which would be assumed at low engine speeds, and the ports 39 remain covered during this phase of the stroke. The crank shaft 33 from the position indicated in Fig. 12, rotates to the position shown in Fig. 13, moving the piston 32 from the position shown in Fig. 12 to the position indicated in Fig. 13. During this movement of the crank shaft 33, the pin 80 again comes in contact with one of the pins 75 on the spindle wheel 73 and moves the cam 76 through the arc of 90° to bring one of its narrow faces in contact with the spring arm 77 as indicated in Fig. 7, thus causing the shaft 70 to be turned in a clockwise direction and withdrawing the wedges 72 from contact with the swinging members 64, thus placing the connecting rod in condition to both freely increase and decrease its length during the next complete revolution of the crank shaft. The inertia of the piston 32 in moving from the position indicated in Fig. 12 to the position indicated in Fig. 13 after the crank shaft has passed, the position of the zero axis O—X, will act to lengthen the connecting rod and to drive a relatively greater amount of exhaust gases out of the cylinder 25 past the valve 31 and out through the port 29 than would be possible if the connecting rod were held at its normal length and the piston restrained from moving above the line "a", thus resulting in substantially better scavenging of the cylinder of burnt gases than would otherwise be possible. The piston in the position shown in Fig. 13 is now ready to move downwardly on the suction stroke and to assume at the end thereof the position indicated in Fig. 10 previously referred to, and the aforementioned cycle of operations is again repeated.

The arm 77 secured to the shaft 70 and operated by the cam 76 is made of spring-like material so as to yield upon movement of the cam 76. When the inertia forces acting on the piston and transmitted through the swinging members 64 lock the wedges 72 against withdrawal from contact with the swinging members 64 the spring arm 77 yields sufficiently to allow rotation of the cam 76 and puts a slight tension on the arm 77 tending to rotate the shaft 70 and to withdraw the wedges 72. As soon as the throw of the crank shaft passes through the zero axes O—X as indicated in Figs. 10 to 13 inclusive, at which point, as previously explained, the value of the inertia forces transmitted between the piston and crank shaft are zero, or shortly thereafter, the pressure of the swinging members 64 on the wedges 72 is relieved and the tension of the spring arm 77 withdraws the wedges 72 from contact with the swinging members 64 and causes them to assume the position shown in Fig. 7. It may be noted here that the wedges 72 will not always free themselves from the swinging members 64 at the moment the throw of the crank shaft passes through the zero axis O—X. This is true for the reason that until the forces transmitted from the upper to the lower part of the connecting rod are substantially of zero value the same prevent the wedges 72 from being withdrawn by the tension of the spring arm 77. For instance, when the piston is going up on the compression stroke and the throw of the crank shaft passes through the axis O—X, the wedges 72 will be placed in engagement with the swinging members 64. At the end of the compression stroke, at "high" speeds of the engine, the inertia of the piston compresses the spring 56 and causes the connecting rod to lengthen. The wedges 72 lock the rod in this lengthened condition during the full power stroke and into the exhaust stroke. As the piston passes up on the exhaust stroke, and as soon as the throw of the crank shaft comes in line with the zero axis O—X, the cam 76 will move to release the wedges 72, but inasmuch as the upper and lower parts of the connecting rod are still held in lengthened condition and the spring 56 compressed, the tension of the spring 56 will prevent the wedges 72 from being withdrawn at this point. However, as the piston continues its upward movement, the forces transmitted by it to the crank shaft by reason of its inertia will reach a point where they balance the compression force of the spring 56, and at this point the wedges 72 will be free to move out of engagement with the swinging members 64 and will return to non-locking position.

It will of course, be understood that the amount which the connecting rod decreases or increases in length when permitted, as above described, will depend entirely upon the inertia of the piston, and inasmuch as the inertia forces in the piston increase as the square of the engine speed, the greater the speed of the engine the greater will be the relative amount of increasing and decreasing of the length of the connecting rod with the corresponding variation in the travel of the piston.

It will be further apparent that this results in an ideal condition for the operation of an internal combustion engine in order to obtain the most perfect results therefrom, inasmuch as the volumetric efficiency of the same is prevented from decreasing at the rate usually associated with engines provided with connecting rods of fixed length, and at the same time as the speed of the engine increases the compression ratio is automatically increased as well as the degree of scavenging of the cylinder.

As is apparent to those skilled in the art, the foregoing results in an engine capable of developing higher speeds and greater torque with a correspondingly greater horsepower as compared to conventional engines of the same relative bore and stroke.

Although I have shown in the accompanying drawings and have described in the foregoing explanation a particular means for locking the connecting rod against a decrease in length during the necessary phases of the cycle of operations of the engine, it is to be understood of course, that I do not limit myself to the specific means shown and described, but various modifications of this mechanism may be employed in connection with a connecting rod capable of both increasing and decreasing its normal length, without departing from the present invention.

Formal changes may be made in the specific embodiment of the present invention without departing from the spirit or substance of the broad invention, the scope of which is commensurate with the appended claims.

What I claim is:

1. In an internal combustion engine, a cylinder, a combustion chamber, a piston, a port in said cylinder cut off from connection with said combustion chamber by said piston during normal low speed operation of said engine, and means actuated by the inertia forces acting on said piston beyond a predetermined engine speed for moving said piston to uncover said port.

2. In an internal combustion engine, a cylinder, a piston reciprocable therein, a crank shaft, a port in the walls of said cylinder normally below the upper surface of said piston when said piston is at the bottom of its normal stroke, and means connecting said piston and said crank shaft acted upon by the momentum of said piston to contract in length on the intake stroke of said engine above a predetermined speed thereof to allow said piston to uncover said port.

3. In an internal combustion engine, a cylinder, a piston in said cylinder, an inlet port and an exhaust port substantially above said piston when said piston is at the top of its stroke, a second intake port in said cylinder below the top of said piston when said piston is at the bottom of its normal stroke, and automatically actuated means for allowing said piston to uncover said second intake port.

4. In an internal combustion engine, a cylinder, a piston reciprocable therein, a crank shaft, a port in said cylinder below the upper surface of said piston when said piston is at the bottom of its normal stroke, a rod connecting said piston and said crank shaft contractible upon a predetermined pressure transmitted thereto by the inertia of said piston to allow said piston to uncover said port, and means locking said rod against contracting except on the intake stroke of said piston.

5. In an internal cmbustion engine, a crank shaft, a cylinder, a piston reciprocable in said cylinder, a connecting rod connecting said piston to said crank shaft, an intake and an exhaust port leading into said cylinder above said piston at the top of its stroke, a second intake port in said cylinder below the top of said piston when at the bottom of its normal stroke, said connecting rod being extensible and contractible in response to the inertia of said connecting rod and said piston beyond a predetermined speed of said engine for increasing the normal length of said rod on each outward stroke of said piston and acting to decrease the normal length of said connecting rod on each inward stroke only of said piston, whereby said piston will uncover said second intake port, and means for locking said rod against contraction during the power stroke of said piston.

6. In an internal combustion engine, a crank shaft, a cylinder, a piston reciprocable in said cylinder, an extensible and contractible connecting rod pivotally connected to said piston and said crank shaft, said connecting rod being extensible beyond its normal length on each up-stroke of said piston, and means preventing shortening of the length of said connecting rod on each alternate down stroke only of said piston.

7. In an internal combustion engine, a cylinder, a piston reciprocable therein, a crank shaft, a two-part rod member connecting said piston to said crank shaft, said rod member being extensible beyond its normal length under the inertia forces in said piston on the compression stroke of said piston, and latch means co-operating with the rod parts for preventing shortening of said lengthened rod during the latter portion of said stroke.

8. In an internal combustion engine, a cylinder, a piston reciprocable therein, a crank shaft, a two-part rod member connecting said piston to said crank shaft, said rod member being extensible beyond its normal length under the inertia forces in said piston on each compression stroke of said piston, and means for holding said rod member in such lengthened position during the ensuing power stroke of said piston, said means releasing during the ensuing exhaust stroke of said piston and comprising a latch member carried by one of said rod parts in co-operative relationship with the other of said rod parts.

9. In an internal combustion engine, a cylinder, a piston reciprocable therein, a crank shaft, and a connecting rod between said piston and said crank shaft, said connecting rod comprising a plurality of parts normally held in predetermined relationship by spring means, said spring means permitting elongation and shortening of the normal length of said connecting rod when acted upon by inertia forces in said piston and connecting rod, and latch means co-operating with said parts for locking said connecting rod against shortening on the power stroke of said piston.

10. In an internal combustion engine, a cylinder, a piston reciprocable therein, a crank shaft, and a rod member connecting said piston to said crank shaft, said rod member comprising a plurality of parts and normally held at a predetermined length, said rod being extensible in response to the inertia of the piston on the exhaust stroke and compression stroke of said piston and being contractible on the power stroke and intake stroke of said piston, and latch means locking said connecting rod against contracting on said power stroke only.

11. In an internal combustion engine, a cylinder, a piston reciprocable therein, a crank shaft, an extensible and contractible rod member connecting said piston and said crank shaft, spring means carried by said rod member restraining said extension and contraction, and latch means for locking said rod member against contraction during the first part of the exhaust stroke of said piston and allowing extension thereof during the latter part of said exhaust stroke.

12. A connecting rod comprising an upper portion and a lower portion slidably connected together, spring means normally holding said portions in a predetermined fixed relationship, a member pivotally secured to one of said portions, a slide in said member, a block carried by the other of said portions in sliding relationship in respect to said slide, and means for locking said pivoted member against pivotal movement in one direction.

13. A connecting rod comprising an upper portion and a lower portion slidably engaging each other, a swinging member carried by said lower portion, a slide in said swinging member, a block carried by said upper portion in engagement with said slide, a wedge member carried by said lower portion movable into engagement with said swinging member to lock the same against swinging in one direction, and a cam member for actuating said wedge member.

14. A connecting rod comprising an upper portion and a lower portion telescopingly engaging each other, spring means tending to hold said portions in fixed relation to each other, a swinging member provided with a slide carried by said lower portion, a block member carried by said upper portion in engagement with said slide, means engageable with said swinging member for locking the same against swinging movement in one direction, a cam, and a yieldable connection between said cam and said means for moving said means into and out of contact with said swinging member.

15. In an internal combustion engine, a cylinder, a piston reciprocable therein, a crank shaft, a connecting rod connecting said piston and said crank shaft, said connecting rod comprising a pair of parts slidably connected together by spring means, a movable slide pivotally secured to one of said parts, a block engaging said slide carried by the other of said parts, means for locking said slide against pivotal movement in one direction, mechanism controlling said locking means, and means carried by said crank shaft cooperating with said mechanism for operating the same.

16. In an internal combustion engine, a cylinder, a piston reciprocable therein, a crank shaft, a rod element connecting said piston and said crank shaft, said rod element comprising a pair of telescoping parts, spring means tending to hold said parts in fixed relationship with respect to each other, a member carried by one of said parts swinging upon telescoping movement of said parts, a wedge carried by one of said parts engageable with said member to lock said parts in telescoped position, a cam for moving said wedge, means for turning said cam, and means secured to said crank shaft engageable with said last named means for moving the same whereby to move said cam.

HERBERT J. KLINE.